United States Patent
Akiyama

(10) Patent No.: US 6,211,969 B1
(45) Date of Patent: Apr. 3, 2001

(54) PRINT DATA CONTROL METHOD

(75) Inventor: Minoru Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/164,595

(22) Filed: Oct. 1, 1998

(30) Foreign Application Priority Data

Oct. 1, 1997 (JP) .................................................. 9-267600

(51) Int. Cl.[7] ............................ H04N 1/403; H04N 1/23; G06K 15/02
(52) U.S. Cl. ............................................ 358/1.9; 358/462
(58) Field of Search ..................................... 358/1.9, 1.15, 358/438, 434, 462, 455, 296, 298, 456, 460, 465, 466; 382/237, 270, 176

(56) References Cited

U.S. PATENT DOCUMENTS

| | | | |
|---|---|---|---|
| 5,125,045 | * 6/1992 | Murakami et al. | 382/270 |
| 5,387,983 | * 2/1995 | Sugiura et al. | 358/434 |
| 5,539,843 | * 7/1996 | Murakami et al. | 382/270 |
| 5,602,655 | 2/1997 | Arakawa et al. | 358/501 |
| 5,862,257 | * 1/1999 | Sekine et al. | 358/462 |

FOREIGN PATENT DOCUMENTS

| | | |
|---|---|---|
| 63-107269 | 5/1988 | (JP) . |
| 64-44753 | 2/1989 | (JP) . |
| 1-184140 | 7/1989 | (JP) . |
| 2-295351 | 1/1990 | (JP) . |
| 3-169572 | 7/1991 | (JP) . |
| 3-221475 | 9/1991 | (JP) . |
| 4-199975 | 7/1992 | (JP) . |
| 5-96785 | 4/1993 | (JP) . |
| 5-211596 | 8/1993 | (JP) . |
| 5-227433 | 9/1993 | (JP) . |
| 8-256255 | 10/1996 | (JP) . |

* cited by examiner

*Primary Examiner*—Scott Rogers
(74) *Attorney, Agent, or Firm*—Foley & Lardner

(57) ABSTRACT

In a control method for image data including binary image data and multilevel image data, line information is attached to line print data for each of lines forming the image data and then the line information and the line print data are stored for each line in a memory. The line information is used to determine whether a data block included in the line print data is one of a binary image data block and a multilevel image data block. The binary image data block and the multilevel image data block for each line are processed according to the line information so as to produce a printed image of the image data.

20 Claims, 4 Drawing Sheets

FIG.3

| DATA TYPE | NUMBER OF BLOCKS | BLOCK B1 | | BLOCK B2 | |
|---|---|---|---|---|---|
| | | ST | END | ST | END |
| MALTILEVEL IMAGE DATA AND BINARY IMAGE DATA TO BE CORRECTED FOR OUTLINE | BL=2 | 1000 | 2000 | 4000 | 5000 |

PRINT DATA CONTROL METHOD

BACKGROUND OF THE INVENTION

1. Field of the Invention

The present invention generally relates to a printer and in particular to a control method for print data including binary image data and multilevel image data.

2. Description of the Related Art

There have been proposed image forming apparatuses or printers that can combine binary image data such as text data with multilevel image data such as graphics data to form mixed text-and-graphics output. For example, in Japanese Patent Unexamined Publication No. 8-256255, combining control data is provided for each dot and according to the combining control data the binary image data and the multilevel image data are processed to form the mixed text-and-graphics output.

There are some conventional image forming apparatus or printer having an outline correction or smoothing function. For example, in Japanese Patent Unexamined Publication No. 5-227433, multilevel image data is converted into a dot pattern representing halftone and then each pixel is compared to surrounding pixels of the pixel. If a predetermined pattern is detected in the surrounding pixels, the outline of the dot pattern is corrected according to the predetermined pattern.

However, the conventional printer using combining control data needs an extra memory for storing the combining control data for each dot, resulting in increased memory capacity.

The other conventional printer having the outline correction function performs outline correction regardless of type of print data when the predetermined pattern is detected in the surrounding pixels. In other words, even in the case where print data is in no need of outline correction, the outline correction is performed if the predetermined pattern is detected, resulting in deteriorated image quality.

SUMMARY OF THE INVENTION

An object of the present invention is to provide print data control method and a printer that can achieve appropriate process of print data including both binary image data and multilevel image data to prevent deterioration of image quality.

Another object of the present invention is to provide a printer that can print mixed binary-and-multilevel image data with high quality and without increasing in memory capacity.

According to the present invention, in a control method for image data including binary image data and multilevel image data, line information is attached to line print data for each of lines forming the image data. The line information is used to determine whether a data block included in the line print data is one of a binary image data block and a multilevel image data block. The line information and the line print data are stored for each line in a memory. The binary image data block and the multilevel image data block for each line are processed according to the line information so as to produce a visible image of the image data.

A printer according to the present invention is provided with a memory storing line information attached to line print data for each of lines forming the image data, the line information is used to determine whether a data block included in the line print data is one of a binary image data block and a multilevel image data block. The printer further includes a discriminator for discriminating between the binary image data block and the multilevel image data block according to the line information, a data processor for processing the binary image data block and the multilevel image data block for each line to produce print image data, and an output device for outputting a visible image from the print image data.

BRIEF DESCRIPTION OF THE DRAWINGS

FIG. 3 is a schematic diagram showing the relationship between a line of print data and an image stored in the print data memory.

DETAILED DESCRIPTION OF THE PREFERRED EMBODIMENT

Figure 1:
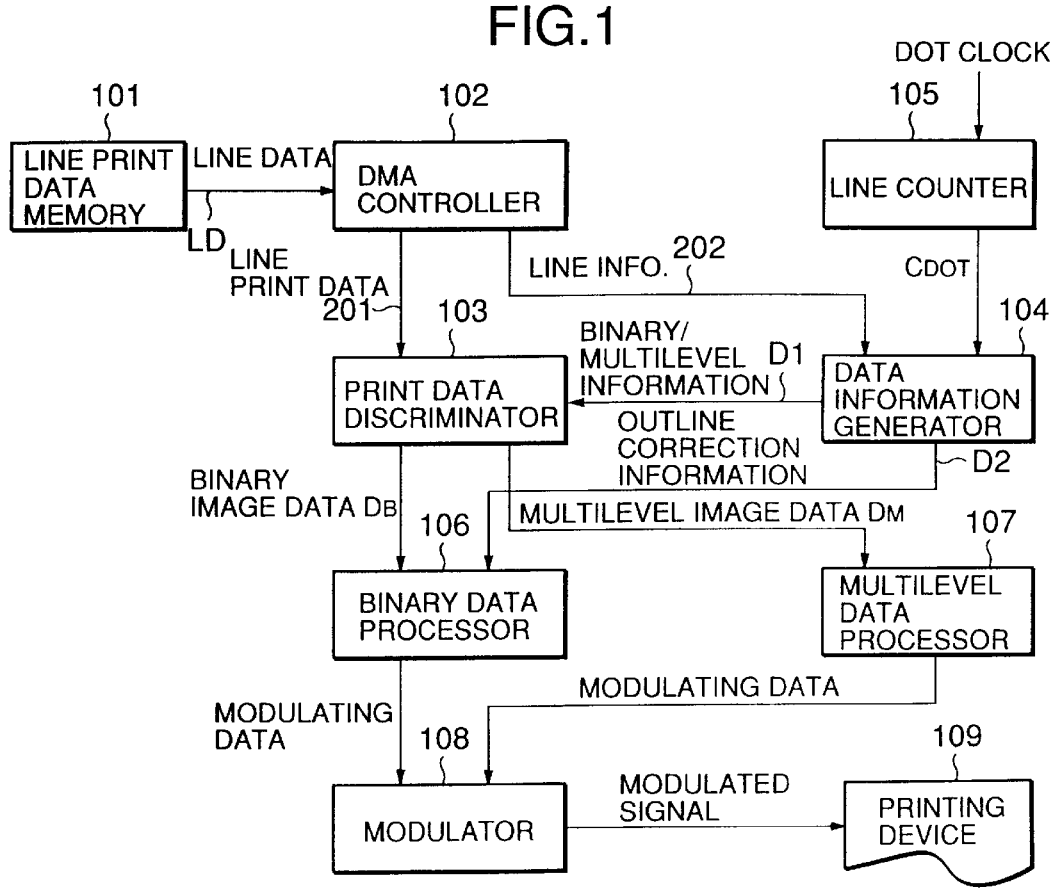
FIG. 1 is a block diagram showing a printer according to an embodiment of the present invention.

Referring to FIG. 1, a printer is provided with a processor (not shown) which produces print data corresponding to a print image consisting of a plurality of lines. The print image may be an image including a binary image in a region and a multilevel image in another region or an image including only one of binary and multilevel images. Line data of the print data for each line is comprised of line print data having line information attached thereto. The line information includes data type and other necessary information as will be described in detail later. A print data memory 101 stores such print data. The print data memory 101 may be a semiconductor memory, a magnetic disk or other recording medium.

A DMA (direct memory access) controller 102 sequentially reads line data LD from the print data memory 101 and extracts line print data 201 and line information 202 from the line data LD. The line print data 201 is output to a print data discriminator 103 and the line information 202 is output to a data information generator 104.

The data information generator 104 receives a dot count value $C_{DOT}$ of a line from a line counter 105. The line counter 105 increments a dot count value $C_{DOT}$ for each line according to a dot clock signal. The data information generator 104 produces binary/multilevel determination information D1 and outline correction information D2 based on the line information 202 and the dot count value $C_{DOT}$. The binary/multilevel determination information indicates whether the dot specified by the dot count value $C_{DOT}$ is included in binary image or of multilevel image. The outline correction information D2 indicates whether the dot specified by the dot count value $C_{DOT}$ is included in binary image data to be corrected for outline. The data information generator 104 outputs the binary/multilevel determination information D1 to the print data discriminator 103 and outputs the outline correction information D2 to a binary data processor 106.

The print data discriminator 103, when receiving the line print data 201 and the binary/multilevel determination information D1, discriminates between binary image data $D_B$ and multilevel image data $D_M$. And the binary image data $D_B$ is output to the binary data processor 106 and the multilevel image data $D_M$ to a multilevel data processor 107.

The binary data processor 106 processes the binary image data $D_B$ to produce modulating data. When it is determined from the outline correction information D2 that the binary image data $D_B$ should be corrected for outline, the binary data processor 106 performs outline correction of the binary image data $D_B$.

The multilevel data processor 107 processes the multilevel image data $D_M$ to produce modulating data. The multilevel data processor 107 may perform well-known gray-scale processing and screening before producing the modulating data. Further, the multilevel data processor 107 is provided with a plurality of image processing functions from which a desired function can be selected according to a select signal.

A modulator 108 receives modulating data for each line from the binary data processor 106 and the multilevel data processor 107 and combines them to produce a modulated signal for each line. A printing device 109 is driven according to the modulated signal to form a printed output.

In an electrophotographic printer or laser printer, the printing device 109 is comprised of a laser, a photosensitive element and other components. The modulator 108 changes the size and position of a dot formed by a laser beam depending on the modulated data received from the binary data processor 106 and the multilevel data processor 107. In this embodiment, the dot clock signal supplied to the line counter 105 has a period corresponding to a single dot. In an inkjet printer, the printing device 109 is comprised of an inkjet head. Since a dot is formed with an ejected ink droplet, the modulator 108 changes the amount of ejected ink depending on the modulated data.

The above functions implemented with the print data discriminator 103, the data information generator 104, the binary data processor 106, the multilevel data processor 107 and the modulator 108 may be implemented with a program-controlled processor running a control program including the same functions.

Figure 2:
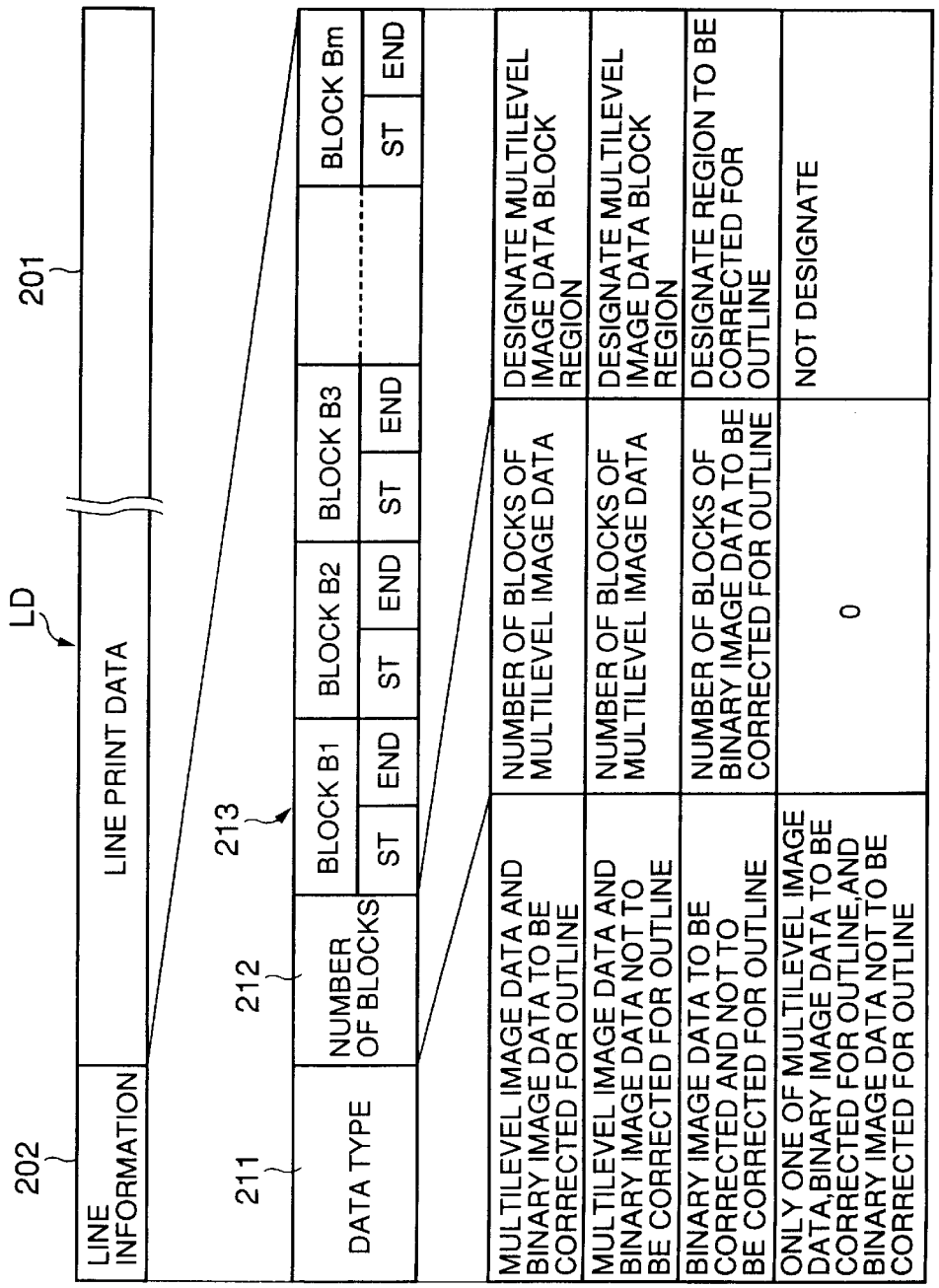
FIG. 2 is a schematic diagram showing the format of a line of print data stored in a data memory according to the embodiment.

As shown in FIG. 2, in line data LD stored in the print data memory 101, the line information 202 is placed in the head of the line data LD. Since the line information is obtained before the line print data 201, the data control process can be efficiently performed.

The line information 202 is used to identify multilevel image data or binary image data, consisting of Data type 211, Number of blocks 212 and position information 213. The position information 213 includes a pair of start dot position ST and end dot position END of each of blocks of predetermined type included in the line print data 201. Here, m blocks B1–Bm are designated and each block is defined by the start and end dot positions ST and END.

The data type 211 is one of the following four types: Type 1) Multilevel image data and binary image data to be corrected for outline; Type 2) Multilevel image data and Multilevel image data and binary image data to be corrected for outline; Type 3) Binary image data to be corrected for outline and Binary image data not to be corrected for outline; and Type 4) Only one of multilevel image data, binary image data to be corrected for outline and binary image data not to be corrected for outline. Therefore, one of four codes corresponding to the four types is stored into the field of data type 211.

The number of blocks 212 is determined depending on the data type 211 so as to discriminate between binary image data block and multilevel image data block in line print data. In the cases of Type 1) and 2), the number of blocks 212 is the number of blocks of multilevel image data. In the case of Type 3), it is the number of blocks of binary image data to be corrected for outline. In the case of Type 4), it is 0 because the line print data 201 includes only one type block data.

The position information 213 designates a position of multilevel image data or binary image data to be corrected for outline. In the case of Type 4), the position information 213 designates nothing. An example will be described hereinafter.

Referring to FIG. 3, as an example, the print data stored in the print data memory 101 includes two blocks of multilevel image data and two blocks of binary image data. A first multilevel image block is placed in a region starting at $1000^{th}$ dot and ending at $2000^{th}$ dot and a second multilevel image block is placed in a region starting at $4000^{th}$ dot and ending at $5000^{th}$ dot as shown in FIG. 3. Further, a first binary image block to be corrected for outline is placed in a region following the first multilevel image region and a second binary image block is placed in a region following the second multilevel image region as shown in FIG. 3.

In the case of such print data, a line 301 is represented by the line data LD as shown in FIG. 3. More specifically, since the print data LD includes two blocks of multilevel image data and two blocks of binary image data to be corrected for outline, the data type of the line information 202 is Type 1) and the number of blocks is BL=2. Since the first block B1 is placed in a region starting at $1000^{th}$ dot and ending at $2000^{th}$ dot, the start position ST is 1000 and the end position END is 2000. Since the second block B2 is placed in a region starting at $4000^{th}$ dot and ending at $5000^{th}$ dot, the start position ST is 4000 and the end position END is 5000. Such line information 202 is followed by the line print data 201 corresponding to the line 301. It is the same with other lines.

In this example, identification data consisting of the number of blocks 212 and the position information 213 is provided for only the multilevel image data. It is possible to provide the identification data for both multilevel image data and binary image data.

Figure 4:
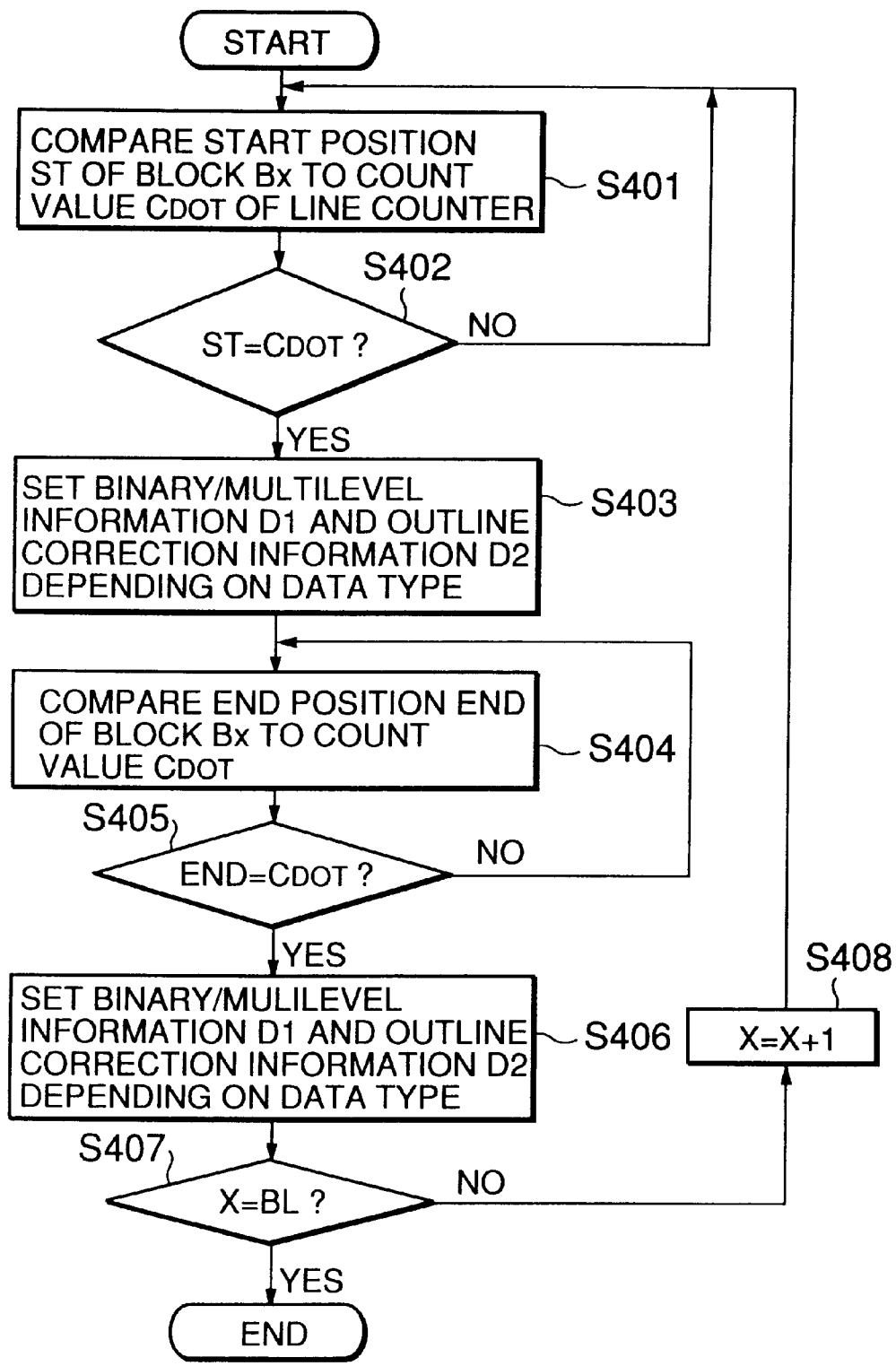
FIG. 4 is a flow chart showing a control operation of a data information generator in the embodiment.

Referring to FIG. 4, the data information generator 104 receives a dot count value $C_{DOT}$ of a line from the line counter 105 which increments the dot count value $C_{DOT}$ according to the dot clock signal. After initializing a variable X to 1, the data information generator 104 compares a start position ST of block Bx to the count value $C_{DOT}$ (step S401) and waits until the count value $C_{DOT}$ reaches the start position ST.

When the count value $C_{DOT}$ has reached the start position ST (YES in step S402), the data information generator 104 sets the binary/multilevel determination information D1 and the outline correction information D2 depending on the data type (step S403). For example, when the dot specified by the dot count value $C_{DOT}$ is included in binary image, the information D1 is set to "binary" and, when it is included in multilevel image, the information D1 is set to "multilevel". When the dot specified by the dot count value $C_{DOT}$ is included in binary image data to be corrected for outline, the outline correction information D2 is set to "outline correction". According to the binary/multilevel determination information D1 and the outline correction information D2, the print data discriminator 103 and the binary data processor 106 are operated as described before.

Subsequently, the data information generator 104 compares an end position END of block Bx to the count value $C_{DOT}$ (step S404) and waits until the count value $C_{DOT}$ reaches the end position END.

When the count value $C_{DOT}$ has reached the end position END (YES in step S405), the data information generator 104 sets the binary/multilevel determination information D1 and the outline correction information D2 depending on the data type (step S406).

Thereafter, it is determined whether the variable X reaches the number of blocks BL (step S407). If X<BL (NO in step S407), the variable X is incremented (step S408) and the steps S401–S408 are repeatedly performed until the variable X reaches BL. When the variable X has reached BL, the data information generating process for that line has been completed and then the steps S401–S407 are similarly performed for the next line.

As described above, according to the present invention, the line information is attached to the line print data as a header and is used to discriminate between multilevel image data and binary image data in blocks for each line. Therefore, mixed binary-and-multilevel print data can be efficiently processed with little increased memory capacity.

Further, the line information may include information for determining whether the binary image data is to be corrected for outline. Since the binary image data is corrected for outline as necessary, print data that is in no need of outline correction is prevented from outline correction. Therefore, deterioration of image quality is avoided.

What is claimed is:

1. A control method for image data including binary image data and multilevel image data, comprising the steps of:
    a) attaching line information to line print data for each of lines forming the image data, wherein the line information is used to determine whether a data block included in the line print data is one of a binary image data block and a multilevel image data block;
    b) storing the line information and the line print data for each line in a memory; and
    c) processing the binary image data block and the multilevel image data block for each line according to the line information so as to produce a visible image of the image data.

2. The control method according to claim 1, wherein the line information includes a position of at least one of a binary image data block and a multilevel image data block included in the line print data.

3. The control method according to claim 2, wherein the line information comprises:
    data type information indicating one of possible combinations of the binary image data block and the multilevel image data block;
    count information indicating count of selected one of the binary image data block and the multilevel image data block included in the line print data; and
    position information indicating a position of a selected block in the line print data.

4. The control method according to claim 1, wherein step c) comprises:
    discriminating between the binary image data block and the multilevel image data block based on the line information;
    processing the binary image data block to produce first print image data;
    processing the multilevel image data block to produce second print image data; and
    outputting the printed image according to the first and second print image data.

5. The control method according to claim 1, wherein the line information includes outline correction information indicating whether a binary image data block included in the line print data is to be corrected for outline.

6. The control method according to claim 5, wherein step c) comprises:
    discriminating between the binary image data block and the multilevel image data block based on the line information;
    processing the binary image data block in a way depending on the outline correction information to produce first print image data;
    processing the multilevel image data block to produce second print image data; and
    outputting the printed image according to the first and second print image data.

7. A printer for printing image data including binary image data and multilevel image data, comprising:
    a memory storing line information attached to line print data for each of lines forming the image data, the line information is used to determine whether a data block included in the line print data is one of a binary image data block and a multilevel image data block;
    a discriminator for discriminating between the binary image data block and the multilevel image data block according to the line information;
    a data processor for processing the binary image data block and the multilevel image data block for each line to produce print image data; and
    an output device for outputting a visible image from the print image data.

8. The printer according to claim 7, wherein the line information includes a position of at least one of a binary image data block and a multilevel image data block included in the line print data.

9. The printer according to claim 8, wherein the line information comprises:
    data type information indicating one of possible combinations of the binary image data block and the multilevel image data block;
    count information indicating count of selected one of the binary image data block and the multilevel image data block included in the line print data; and
    position information indicating a position of a selected block in the line print data.

10. The printer according to claim 7, wherein the line information includes outline correction information indicating whether the binary image data block is to be corrected for outline.

11. The printer according to claim 10, wherein the data processor comprises:
    a first processor for processing the binary image data block in a way depending on the outline correction information to produce first print image data;
    a second processor for processing the multilevel image data block to produce second print image data; and
    a combiner for combining the first and second print image data to produce the print image data.

12. A memory of the printer according to claim 7, storing the image data comprising:
    line print data for each of lines forming the image data; and
    line information attached to the line print data, the line information is used to determine whether a data block included in the line print data is one of a binary image data block and a multilevel image data block.

13. The memory according to claim 12, wherein the line information includes a position of at least one of a binary image data block and a multilevel image data block included in the line print data.

14. The memory according to claim 13, wherein the line information comprises:

data type information indicating one of possible combinations of the binary image data block and the multilevel image data block;

count information indicating count of selected one of the binary image data block and the multilevel image data block in the line print data; and position information indicating a position of a selected block in the line print data.

15. The memory according to claim 12, wherein the line information comprises outline correction information indicating whether the binary image data block is to be corrected for outline.

16. A memory for storing a program for controlling a microprocessor provided in a printer for printing image data including binary image data and multilevel image data, the program comprising the steps of:

a) storing line information attached to line print data for each of lines forming the image data, the line information is used to determine whether a data block included in the line print data is one of a binary image data block and a multilevel image data block;

b) discriminating between the binary image data block and the multilevel image data block according to the line information;

c) processing the binary image data block and the multilevel image data block for each line to produce print image data; and d) outputting a visible image from the print image data.

17. The memory according to claim 16, wherein the line information includes a position of at least one of a binary image data block and a multilevel image data block included in the line print data.

18. The memory according to claim 17, wherein the line information comprises:

data type information indicating one of possible combinations of the binary image data block and the multilevel image data block;

count information indicating count of selected one of the binary image data block and the multilevel image data block included in the line print data; and position information indicating a position of a selected block in the line print data.

19. The memory according to claim 16, wherein the line information includes outline correction information indicating whether the binary image data block is to be corrected for outline.

20. The memory according to claim 19, wherein step c) of the stored program comprises:

processing the binary image data block in a way depending on the outline correction information to produce first print image data;

processing the multilevel image data block to produce second print image data; and combining the first and second print image data to produce the print image data.

* * * * *